Nov. 16, 1965 R. C. GESCHWENDER 3,218,217
APPARATUS FOR MAKING CELLULAR MATERIAL
Filed Oct. 15, 1962 6 Sheets-Sheet 1
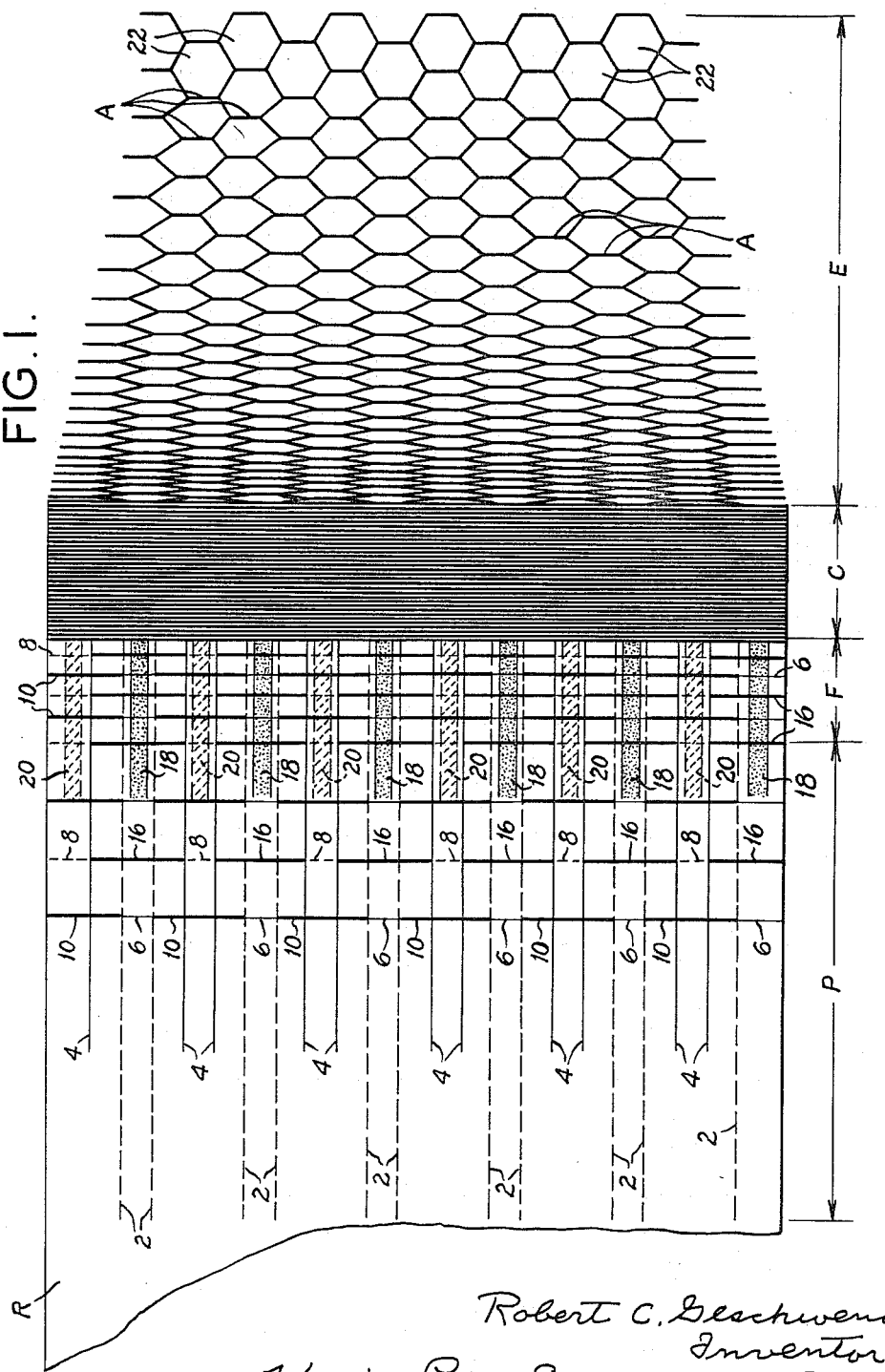

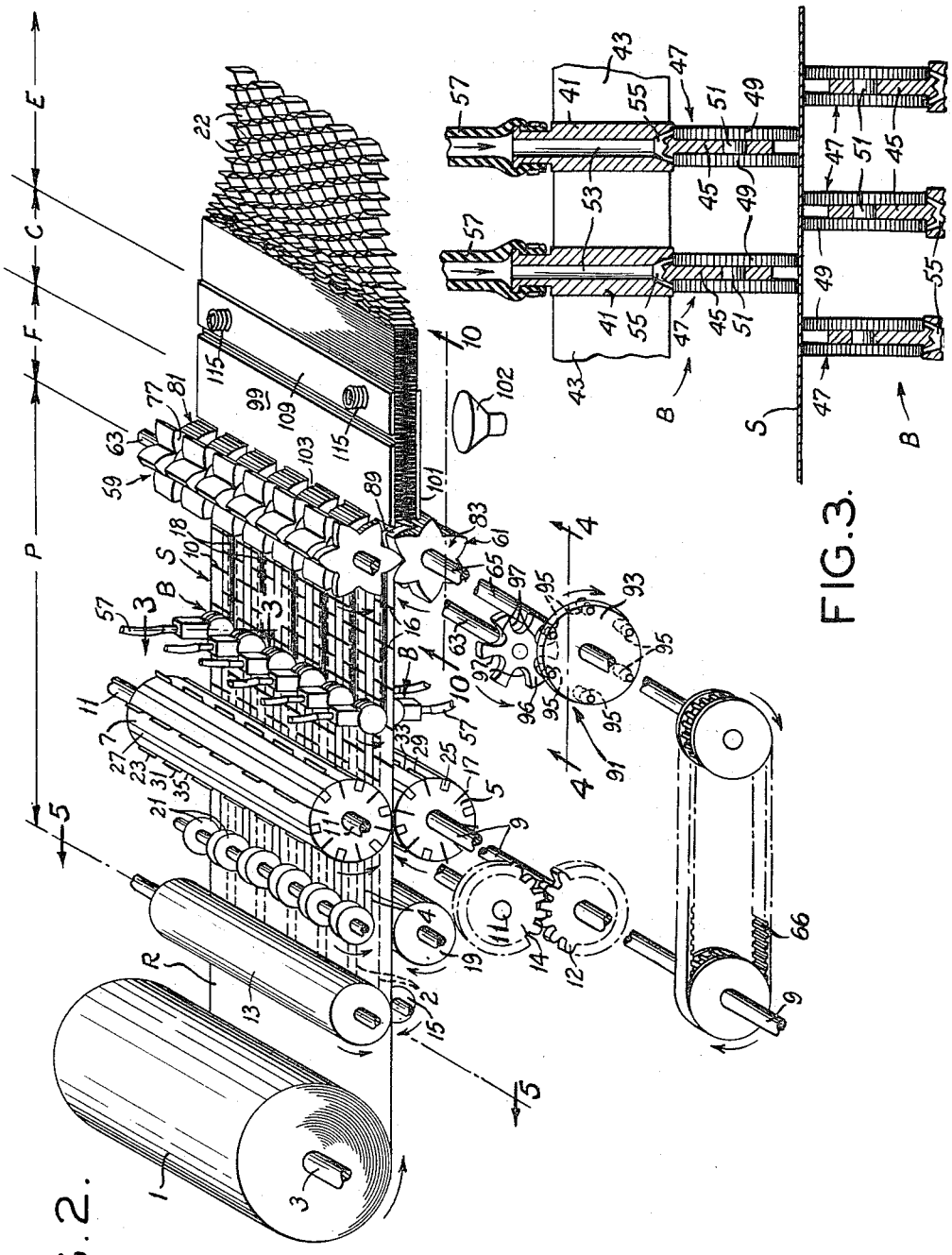

Nov. 16, 1965     R. C. GESCHWENDER     3,218,217
APPARATUS FOR MAKING CELLULAR MATERIAL
Filed Oct. 15, 1962                               6 Sheets-Sheet 3
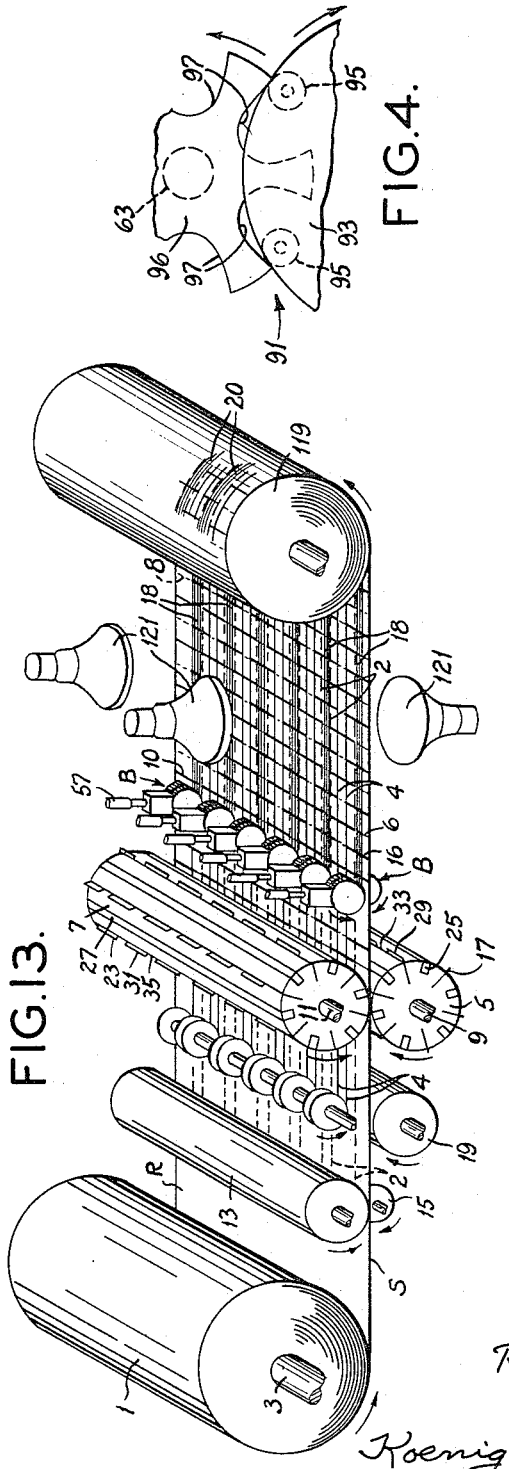
Robert C. Geschwender,
Inventor
Koenig, Pope, Senniger and Powers,
Attorneys.

Nov. 16, 1965    R. C. GESCHWENDER    3,218,217
APPARATUS FOR MAKING CELLULAR MATERIAL
Filed Oct. 15, 1962    6 Sheets-Sheet 4
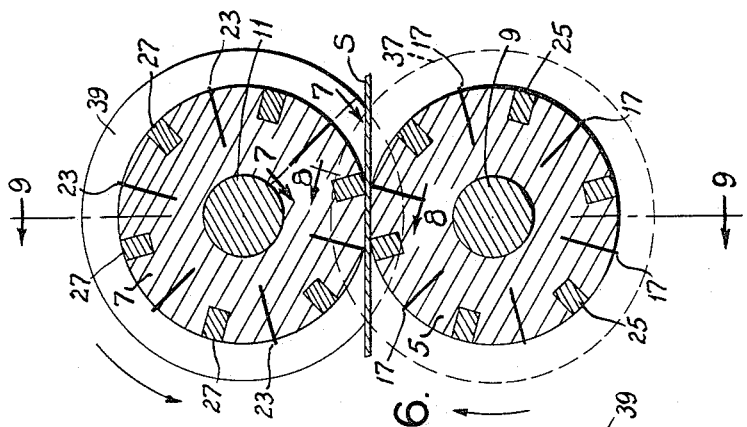
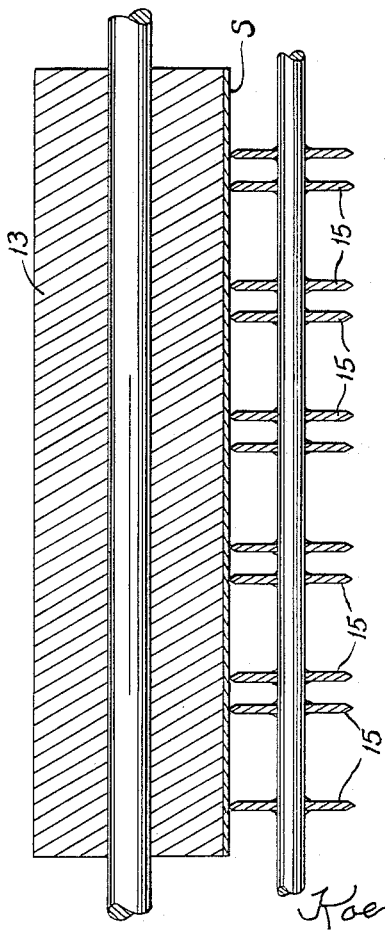
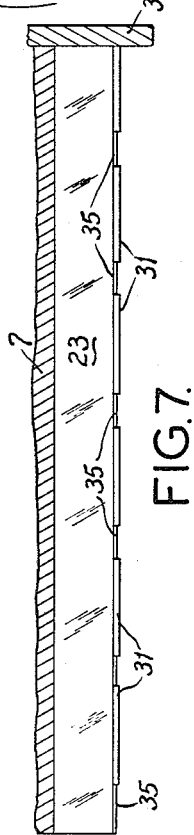
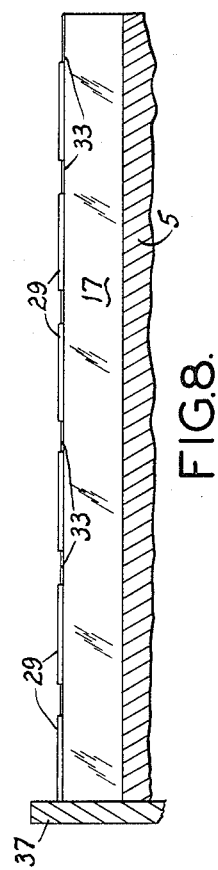
Robert C. Geschwender,
Inventor,
Koenig, Pope, Senniger and Powers,
Attorneys.

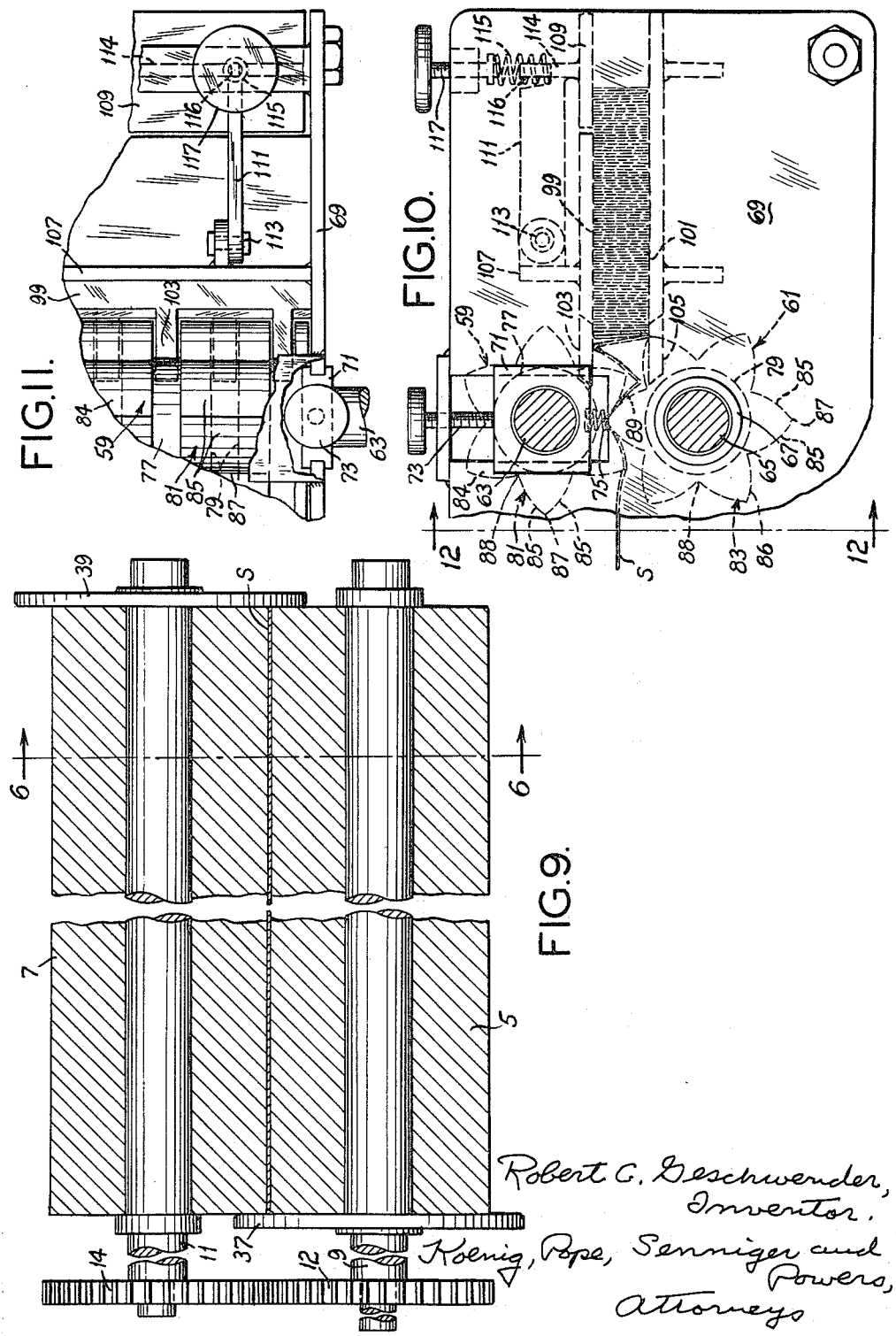

Nov. 16, 1965     R. C. GESCHWENDER     3,218,217
APPARATUS FOR MAKING CELLULAR MATERIAL
Filed Oct. 15, 1962                      6 Sheets-Sheet 6
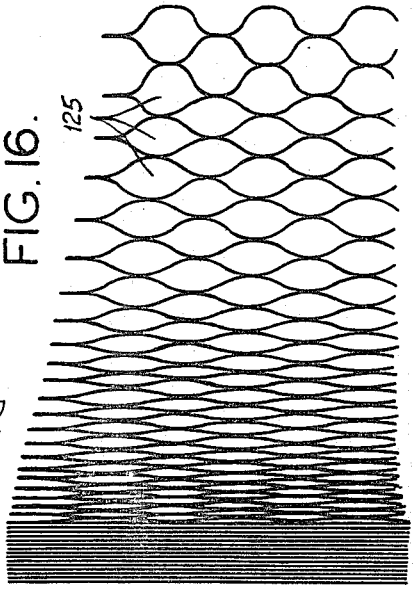
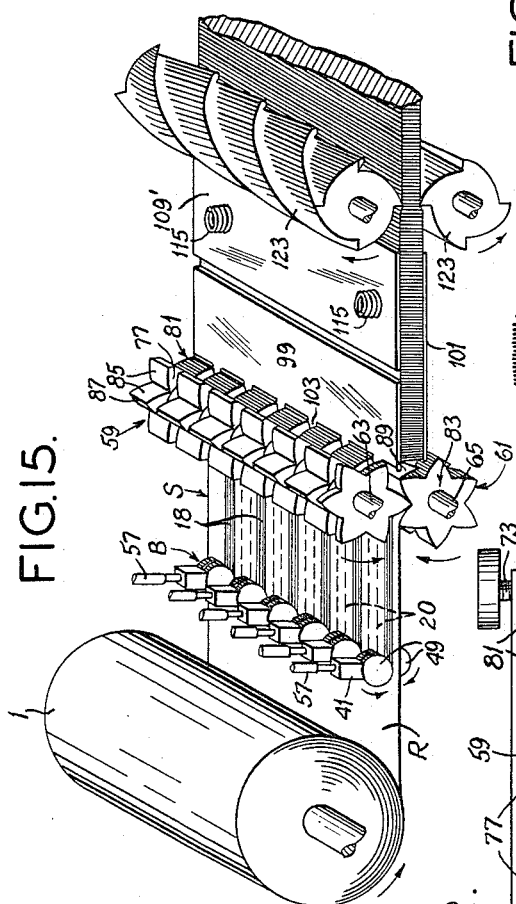
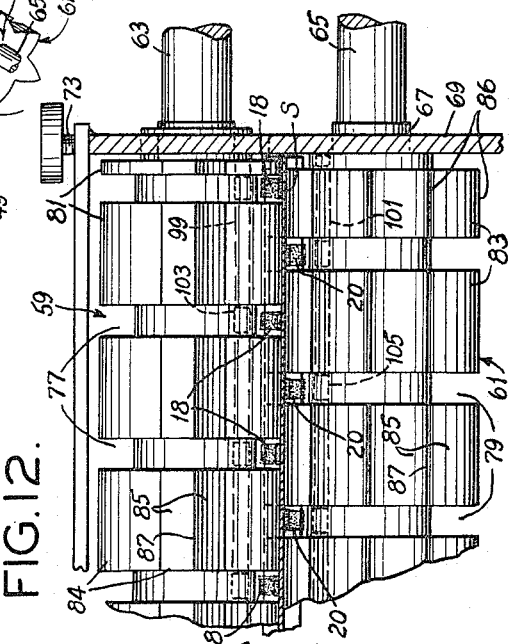
Robert C. Geschwender,
Inventor.
Koenig, Pope, Senniger and Powers,
Attorneys.

United States Patent Office 3,218,217
Patented Nov. 16, 1965

3,218,217
APPARATUS FOR MAKING CELLULAR
MATERIAL
Robert C. Geschwender, 2241 Y St., Lincoln, Nebr.
Filed Oct. 15, 1962, Ser. No. 230,583
1 Claim. (Cl. 156—474)

This invention relates to the fabrication of honeycomb and like cellular materials, and with regard to certain more specific features, to improved apparatus and methods for producing the same.

Among the several objects of the invention may be noted the provision of reliable, low-cost and comparatively simple apparatus designed to produce cellular sheet materials; and the provision of apparatus of the class described which, in a continuous process, will produce such materials of high quality and at high speed. Other objects and features will be in part apparent and in part pointed out hereinafter.

The invention accordingly comprises the elements and combinations of elements, steps and sequence of steps, features of construction and manipulation, and arrangements of parts which will be exemplified in the constructions and methods hereinafter described, and the scope of which will be indicated in the following claim.

In the accompanying drawings, in which several of various possible embodiments of the invention are illustrated, FIG. 1 is a plan view illustrating a strip of material in the process of conversion to a finished honeycomb product;

FIG. 2 is a schematic view of apparatus adapted to perform the operations illustrated in FIG. 1;

FIGS. 3, 4 and 5 are cross-sectional views taken on lines 3—3, 4—4 and 5—5 of FIG. 2, illustrating certain details;

FIG. 6 is a detail cross section of certain scoring and slitting rolls, being taken on line 6—6 of FIG. 9;

FIGS. 7 and 8 are fragmentary detail sections taken on lines 7—7 and 8—8 of FIG. 6, showing die rules contained in said slitting and scoring rolls;

FIG. 9 is an axial section taken on line 9—9 of FIG. 6, illustrating features of said slitting and scoring rolls;

FIG. 10 is a view on line 10—10 of FIG. 2, showing details of strip folding and compressing means;

FIG. 11 is a plan view of FIG. 10;

FIG. 12 is a fragmentary detail section taken on line 12—12 of FIG. 10;

FIGS. 13 and 14 (like FIG. 2) are schematic views illustrating a second form of the invention;

FIG. 15 (also like FIG. 2) is a schematic view illustrating a third form of the invention; and FIG. 16 is a fragmentary view showing a variation in the form of the product that may be made.

Corresponding reference characters indicate corresponding parts throughout the several views of the drawings.

Referring now more particularly to FIG. 1, there is shown a raw-material strip S which at its left end is in the form of a flat strip designated R. This should be comparatively thin but stiff, such as heavy kraft paper, cardboard or plastic, thin aluminum or other metal sheet or like creasable substance. The strip R may be supplied from a roll 1 of the same (see FIG. 2). The strip has preliminary scoring, slitting and adhesive-applying operations performed upon it while moving through the range P; then while moving through the range F a folding operation is performed; thereafter, while moving through the distance C, a compressing operation is performed; and while moving through the distance E, the material (if desired) may be stretched to its finally useful form. However, the last-named step may be postponed until transfer of the compressed material to another location, before or after appropriate segmentation into desired lengths.

The apparatus to be described first longitudinally scores or creases the underside of the strip, as shown at 2 in FIG. 1, and then scores or creases the upper side of the strip, as shown at 4. The score lines 2 are paired, with the exception of one adjacent one margin of the strip S. The score lines 4 are likewise paired, with the exception of one adjacent the other margin of the strip S.

Next the strip is spacedly and transversely scored or creased on its upper side as at 6, all of these scores being located between pairs of the lower score lines 2, with the exception of one at one margin. At the same time that the score lines 6 are made, collinear slits, as shown at 10, are cut. All of these extend between the pairs of score lines 2, with the exception of one at said other margin.

The strip is also transversely scored on its underside as at 8. All of score lines 8 are located between pairs of upper score lines 4, except one at said other margin. Score lines 8 are staggered in relation to score lines 6. At the same time that the score lines 8 are made, collinear slits 16 are cut. These extend between pairs of score lines 4, with the exception of one at a margin. Slits 16 are staggered in relation to slits 10. Thus, it will be seen that the score lines 6 and 8 are staggered and that the slits 10 and 16 are also staggered. Interdigitating portions of the slits 10 and 16 equal one-third of their respective lengths. The distance between any two adjacent score lines of the group 2, 4 equals the interdigitating distance. While these distances are preferable because they result in desirable final regular hexagonal cells in the finished material, they may be modified to produce other cellular forms, as will appear.

Next (referring again to FIG. 1) stripes of adhesive 18 are applied to the upper side of the sheet, so as to cross the upper transverse score lines 6. Alternate adhesive stripes 20 are also applied to the lower side of the sheet, so as to cross the lower transverse score lines 8. Thus, all of the preliminary scoring, slitting and adhesive-applying operations on the sheet are completed on its flat form upon its moving through the distance P.

Next the sheet is reversely partially folded while moving through the distance F, reverse folds occurring on the upper and lower score lines 6 and 8. This may be referred to as a pleating operation.

In view of the above, it will be seen that alternate rows of the slits 10 and 16 interdigitate. Those in alternate rows also form staggered columns of the same along the length of the strip. Thus one column is composed of slits 10 and the other of slits 16. The adhesive stripes 20 on one (lower) side of the strip or sheet cross only the slits of the columns of slits 10, and stripes 18 on the other (upper) side of the strip cross only the slits in the column of slits 16.

Next a drag or braking operation is performed upon the upper and lower parts of the reversely folded (pleated) material, so that the pleating becomes compressed while traversing the range C. This results in adjacently folded upper and lower areas of adhesive coming into bonding contact, thereby forming staggered connections or bonds between adjacent sections of the folded pleats. The adhesive connections may be caused to become permanent by the use of so-called self-contact cement or adhesive; or if heat-setting adhesive is used, setting may be accomplished by heating in the region C.

In view of the above, it will be apparent that between the adhesive connections or bonds are interspersed the staggered slits 10 and 16 which, after the material leaves the range C, may be pulled out into hexagonal form, as illustrated at 22. This occurs in the range E. By the pleating operation at F and the compressing operation at C, the planes of the compressed pleats become normal to the plane of the material in the range P, so that the axes of the final honeycomb cells 22 are normal to this original plane.

In the following description of apparatus for producing the product shown in FIG. 1, some bearings and framework are not shown, being conventional.

Referring to FIG. 2, the strip, as raw material R, is supplied from the roll 1. Roll 1 is mounted on a suitable arbor 3. A conventional slack brake may be employed on the roll if required (not shown). At numerals 5 and 7 are shown tangently related transverse scoring and slitting rolls mounted on shafts 9 and 11, respectively. These rolls may also function as draw rolls, although this is not always necessary for reasons which will appear. Shaft 9 is a power shaft, driven from a suitable power source (not shown). The shaft 11 is driven at a 1:1 speed ratio from shaft 9, by a suitable drive composed of gears 12 and 14 having equal numbers of teeth. The rolls 5 and 7 are of equal diameters so that they have equal tangential speeds at the pass space between them. This space is suited to the thickness of the strip R which is being operated upon.

In passing to the rolls 5 and 7 the sheet moves between an upper backing roll 13 and a gang of properly spaced lower linear scoring discs 15 (FIGS. 2 and 5). Discs 15 produce said set of score lines 2 on the underside of the strip (FIG. 1). The strip is then drawn through a similar but lower backing roll 19 and an upper gang of scoring discs 21 (FIG. 2). The scoring discs 21 form the score lines 4 on the upper side of the strip.

Each of rolls 5 and 7 is provided with a number (six in the present example) of metal die rules 17 and 23 (FIGS. 6-8). These are held in suitable axial slots in these rolls. Each roll 5 and 7 is also provided alternately with a number (six in the present example) of replaceable blade-backing strips 25 and 27, respectively, also held in suitable axial slots in these rolls. The gears on 12 and 14 are meshed to phase the rolls so as to bring each die rule 17 or 23 opposite a blade-backing strip 27 or 25, as the case may be (see FIG. 6). The die rules 17 and 23 carry slitting portions or blades 29 and 31, respectively. These are related so that they will cut the staggered and interdigitating slits 16 and 10. The blades 29 and 31 extend far enough from the roll surfaces that they will contact the blade-backing strips 25 and 27, whereby the strip S becomes completely pierced to form the slits 16 and 10. Between the spaced blades 29 and 31 are lower scoring blade portions 33 and 35, respectively. These also oppose the backing strips 27 and 25, respectively, but do not reach them and will simply score the strip S, rather than pierce it. Thus the transverse bottom and top scores 8 and 6 are formed. It will be appreciated that two sets of rolls such as 5, 7 could be employed, one set carrying merely scoring blades and the other the cutting blades. It may also be mentioned that although transverse scores 6 and 8 are in most cases preferred, they may be omitted in some cases of easily foldable material. In such event the scoring portions 33 and 35 would be omitted. To prevent the strip S from biasing laterally from the rolls 5 and 7, end flanges 37 and 39 are used on these rolls, respectively, as shown in FIGS. 6-9.

After the scored and slitted strip passes the rolls 5 and 7, it progresses to a bank B of upper and lower adhesive applicators (see FIG. 2 and details in FIG. 3). A description of one applicator will suffice, since all are alike, the lower ones (partially shown) being merely inverted with respect to the upper ones (fully shown). Each consists of a piece 41, supported on a suitable crossbar such as 43 and having a portion 45 rotatably supporting a spool 47. Each spool comprises spaced peripherally engraved discs 49 connected by a spindle 51 rotatable in a portion 45 extending from piece 41. The piece 41 contains a passage 53, branched as shown at 55, to feed adhesive to the adjacent engraved discs 49. Adhesive is brought into the passage 53 under suitable pressure through flexible conduits 57. Although each spool 47 applies two stripes of adhesive, these coalesce to form the single stripes 18 and 20, as shown in FIG. 1. Moreover, in a succeeding operation these stripes become increased in width by compression during a succeeding pleating operation. Each stripe spreads to infill the space between paired scores 2 or 4, or from a single outer score 2 or 4 to the adjacent strip margin, as the case may be.

The effect of the pleating operation in range F (FIG. 1) is accomplished by the following apparatus, referring to FIGS. 2, 4, 10, 11 and 12. This apparatus comprises an upper pleating rotor 59 and a lower pleating rotor 61. These are carried on shafts 63 and 65, respectively. Shaft 65 is driven from shaft 9 by a positive belt drive 66 at a 1:1 speed ratio. The shaft 65 is carried in a pair of bearings on opposite sides of the machine. One bearing is shown at 67 on a frame part 69. The other shaft 63 is carried in adjustable side bearings, one of which is shown at 71. A screw adjustment 73 is provided for each bearing 71. This is adapted in connection with a spring 75 properly to position the rotors 59 and 61.

Rotors 59 and 61 have grooves or spaces 77 and 79, respectively. These separate adjacent portions forming star wheels 81 and 83, respectively. As shown in FIG. 12, the upper star wheels 81 are wide enough to bridge the lower grooves 79. The lower star wheels 83 are wide enough to bridge the upper grooves 77. Assuming strip S to extend between rotors 59 and 61, the upper grooves 77 accommodate the upper stripe lines of adhesive 18. The lower grooves 79 accommodate the lower stripes of adhesive 20. The star wheels 81 press on the upper side of the strip S opposite the lower stripes of adhesive 20 in grooves 79. The lower star wheels 83 press on the underside of the strip S opposite the upper stripes of adhesive 18 in grooves 77. As appears in FIG. 12, the star wheels 81 and 83 are not necessarily all of the same width. Each star wheel 81 and 83 has six teeth or lobes 84 and 86, respectively. Each lobe has two arcuate convex sides 85 intersecting at an outer cusp 87. Adjacent sides of adjacent lobes intersect at inner cusps 88. The intersections of tangents at the ends of the two adjoining curves forming each cusp are located substantially at 90° to one another. The upper and lower rotors 59 and 61 are rotated (by apparatus to be described) so that the lobes 84, 86 thereon successively interdigitate. The lobes 84, 86 on the rotors reversely fold and crease the strip as shown at 89 in FIG. 2 so as to convert it into accordion form.

In order that the same amount of strip material shall be taken in between the rotors 59 and 61 as is fed out from between the rolls 5 and 7, the circumferential distance around each roll 5 or 7 is made equal to the circumferential distance traced along the twelve arcuate sides of the petaline form of each star wheel 81 or 83. For example, if each arcuate side 85 is one inch in length, then the circumferential distance around one of the rolls 5 or 7 is one foot. More generally, the peripheral distance around each roll 5 or 7 shall be the same or a whole multiple of the distance around a star wheel measured along its outline.

Since the forms of the star wheels 81 and 83 are dictated to obtain an appropriate folding action, they will in general not be appropriate to function conjugately as gear teeth to obtain a continuous 1:1 drive between the rotors 59 and 61. Therefore the intermittent form of drive shown at 91 is used (FIGS. 2 and 4). This consists of a lantern wheel 93 on shaft 65. Wheel 93 has six drive pins or rollers 95. On shaft 63 is a plate 96 in which are six bights 97. These bights are so formed that for one period of rotation, shown as just having been finished in FIGS. 2 and 4, the lantern wheel 93 has driven the plate 96, thereby having caused a lower lobe 84 on the upper rotor 59 to have followed an upper lobe 86 on the lower rotor 61 with strip material therebetween.

Then the next upper lobe 86 on the lower rotor 61 is in a position to drive the lowermost lobe 84 on the upper rotor 59 with the strip material therebetween, until the next pin 95 on the wheel 93 gets into position in the next succeeding bight 97 to effect a drive between the lantern wheel 93 and plate 96. Thus the drive 91 takes over the driving action from shaft 65 to shaft 63 during the interval that the lower pleating star wheels 83 do not directly drive the upper pleating star wheels 81. This interval is shown as being at completion in FIGS. 2 and 4. No driving occurs through the drive 91 during the interval that the star wheels 83 drive the star wheels 81. This action is shown as being initiated in FIG. 2. Thus the lobes of the star wheels may be designed for proper folding action to accomplish pleating without the need for their shapes meeting the criteria for properly formed gear teeth.

The reverse-folding action performed by the rotors 59 and 61 makes open pleating, as indicated in FIG. 10, requiring compression in order that opposed infolded areas of adhesive on opposite sides of the sheet may be brought into engagement. Such compression occurs in the range C and is brought about by providing fixed upper and lower throat-forming guide plates 99 and 101, respectively. The upper plates 99 have stripping fingers 103 which extend into the grooves 77 of the rotor 59. The lower guide plate 101 has stripping fingers 105 which extend into the grooves 79 of the lower rotor 61.

Pivoted to a rib 107 above plate 99 is a movable pressure plate 109. This plate is carried by arms 111, pivoted at 113 (FIGS. 10 and 11). Only one arm and one pivot are shown in FIGS. 10 and 11, but it will be understood these are multiplied across the machine, being joined by a bar 114 on which are studs 116 carrying springs, one of which is shown at 115. The springs 115 serves resiliently to push down the pressure plate 109. The springs 115 are backed by adjustable screws, one of which is shown at 117, whereby the amount of downward pressure on plate 109 may be adjusted. Thus as the partially pleated material passes from between plates 99 and 101, it is subjected to braking or holding action, so that the loose pleats become tightly compressed, as shown in FIG. 10. This brings opposed infolded sections of adhesive on each of the stripes 18 and 20 into engagement, thereby effecting bonded attachments which are lettered A in FIG. 1. If the adhesive is of a self-contact nature, the attachment becomes permanent at once. If setting by heating is required for the adhesive, plate 101 may be heated by suitable means such as heat lamps under plate 101, one of which is shown at 102. Usually a contact cement requires no heating unless it be to drive off certain liquefying solvents.

After the compressed pleated material leaves the space between plates 101 and 109, it is in compacted form, ready for stretching, as shown at the right in FIGS. 1 and 2. Stretching is accomplished simply by pulling upon it in an axial direction along the length of the strip. This pulling may be accomplished by any suitable means as the material leaves the machine, or it may be preferable to segment the material before stretching for convenience in delivery to the point of use. The stretched material has various uses, for example such as cellular material to be sandwiched between wood or cardboard sheets for lightweight structures.

It will be understood that while rolls such as 5 and 7 may, in addition to their slitting and scoring functions, be used to pull the material from the roll 1, such pulling functions may be omitted by increasing the nip space between them. In such event the action of the star wheels 81 and 83 may be employed to effect withdrawal from the roll 1.

In FIGS. 13 and 14 is shown an alternative form of the invention in which like numerals designate like parts, requiring no further description. In this case the preliminary operations of scoring, slitting and applying adhesive are performed in a separate section of the device as shown by FIG. 13, wherein the preliminarily treated sheet is rolled up on a storage roll such as shown at 119. It is later unrolled in connection with a second section of the machine as shown in FIG. 14, for pleating. In order that this may be accomplished, one of the conventional contact adhesives is used to form the stripes 18 and 20. This adhesive may have in it a solvent for purposes of easy application by the discs 49. Heat lamps such as shown at 121 are employed to drive off enough of this solvent that the adhesive bonds to the sheet while retaining its self-contacting characteristics. In the roll 119 no two stripes of adhesive contact each other, so that unrolling may be effected, as illustrated in FIG. 14. This is because cold contact adhesive will not again bond to the sheet. Upon unrolling, pleating and compressing operations may be performed in the separate machine components, requiring no further description. During the compression, adjacent areas of the cold contact adhesive will adhere upon contact, this being an inherent function of such adhesive.

It will also be noted that in all forms of the invention the star wheels 81 and 83 in performing the pleating operation do not contact the adhesive stripes which pass through the grooves 77 and 79 of the rotors 59 and 61 between the star wheels thereon.

The form of the invention shown in FIGS. 13 and 14 has the advantage that the preliminary scoring, slitting and adhesive-applying operations may be performed by parts of the apparatus at one location and the pleating operation performed by parts at another location. It also has the advantage that fewer variables require coordination. Thus, for example, no precise linear-feed relationship needs to be maintained between the rolls 5 and 7 and the star wheels 81 and 83. Moreover, sheets prepared and rolled up as illustrated in FIG. 13 may, after storage, be sent to any one of a number of other machines, as illustrated in FIG. 14.

In FIG. 15 is shown a subassembly such as shown in FIG. 14 but illustrating another form of the invention. Like numerals designate like parts. In this case the strip R is first applied with upper and lower adhesive stripes 18 and 20 and then creased into accordion form by the rotors 59 and 61. The braking plate, numbered 101', is made somewhat wider than elsewhere shown in the drawings, to assure complete drying of the adhesive before a set of upper and lower milling rotors 123 is reached. These rotors skive off opposite folds in the faces of the accordion-pleated, pressed and adhered material so that it becomes in effect adjacent ribbons adhered to one another in staggered fashion. When the material is pulled out, it will appear as shown in FIG. 16, in which the cellular forms are of rounded forms rather than polygonal. In this case the skiving rotors in effect produce the slits required, the star wheels 81 and 83 providing the folds without preliminary scoring. However, if desired, preliminary scoring could be employed as above described.

Instead of performing both scoring and slitting functions by one pair of rolls such as 5 and 7, two pairs of such rolls may be employed, one pair performing scoring functions only and another pair performing slitting functions only. Other variations within the scope of the invention as set forth in the appended claim may be adopted. Thus the pleating may be performed in some instances without the preliminary transverse scoring 6 and 8, as is illustrated in FIG. 15. Also in the case of FIG. 15 the longitudinal scoring accomplished by the scoring rolls such as 21 and 15 is omitted. As a result, cells 125 are of more or less curved form, approximating hexagons without their precisely formed corners, as shown for example in FIG. 16. In such case the backing rolls 13, 19 and the scoring discs 15, 21 are omitted; also the scoring portions 33, 35 of the rules 17 and 23. Thereafter accordion pleating is effected entirely by folding performed by the star wheels 81 and 83 and then compressed as above described.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

In apparatus for making cellular material including means for moving a strip of flexible sheet material, slitting means for forming columns of interdigitating transverse collinearly arranged slits in the strip, a drive for the slitting means, means for applying stripes of adhesive on opposite sides of the strip so as to extend along said columns across the slits; folding means comprising driving and driven rotors on opposite sides of the strip, meshed wheels on the rotors, each of said wheels having several lobes, each lobe being of a form outlined by convexly curved surfaces terminating in substantially a cusp, the lobes on each wheel on the driving rotor meshing with the lobes of a wheel on the driven rotor for receiving and folding the strip therebetween, lobes on the driving rotor at intervals following lobes on the driven rotor to exert a driving action on the latter through the strip, a first drive shaft for constantly driving said driving rotor, a second drive shaft for said driven rotor, intermittent drive means between said first and second drive shafts for intermittently driving the latter during the intervals when the lobes of the wheels on the driven rotor are not driven by the lobes of the wheels on the driving rotor, whereby lobes on the wheels of the driven rotor follow lobes on the wheels of the driving rotor, and constant-ratio drive means between said drive for the slitting means and said first drive shaft.

References Cited by the Examiner
UNITED STATES PATENTS

| | | | |
|---|---|---|---|
| 2,581,421 | 1/1952 | Lombard et al. | 156—204 |
| 2,636,540 | 4/1953 | Lincoln | 156—474 |
| 2,670,026 | 2/1954 | Ungar | 156—474 |
| 2,670,314 | 2/1954 | Ungar | 156—197 |
| 2,936,021 | 5/1960 | Steele et al. | 156—197 |
| 3,006,798 | 10/1961 | Holland | 156—197 |
| 3,074,839 | 1/1963 | May et al. | 156—197 |

EARL M. BERGERT, *Primary Examiner.*